Patented Apr. 16, 1935

1,998,218

UNITED STATES PATENT OFFICE 1,998,218

CATALYST AND PROCESS FOR PRODUCTION OF ACETIC ACID

Ralph Lyman Brown, Syracuse, N. Y., assignor to Atmospheric Nitrogen Corporation, New York, N. Y., a corporation of New York No Drawing. Application June 20, 1931, Serial No. 545,850

16 Claims. (Cl. 260—116)

This invention relates to the production of oxygenated organic compounds, more particularly a process for the production of acetic acid from methanol and carbon monoxide and catalytic agents therefor.

Various catalytic agents have been proposed for the synthesis of acetic acid from carbon monoxide and methanol and/or hydrogen. The problem is complicated because of the variety of side reactions which may occur. For satisfactory commercial use the catalyst not only should be active for the production of the desired end product but it should not promote any of the numerous other possible reactions resulting in the consumption of the methanol and the production of such substances as hydrocarbons, aldehydes and other acids, or the decomposition or cracking of the reacting materials with consequent deposition of carbon on the catalyst and loss in activity. Furthermore, the catalyst to be commercially usable must be stable in the sense of resistance to temperature and to deterioration with time.

I have found that the desired acetic acid reaction is promoted by the novel catalytic agents hereinafter described comprising tungsten in conjunction with small amounts of promoter ingredients. I have found that oxide of tungsten will catalyze the production of acetic acid from methanol and carbon monoxide and that this activity may be promoted by incorporation therewith of relatively small amounts of other substances which act in the sense of preventing undesired decomposition or reactions of the methanol, or rendering the catalyst material heat resistant and stable or in some other and as yet not clearly understood manner so that the activity per se for acetic acid formation is increased and the production of undesired side reaction products reduced.

The reaction is preferably carried out at an elevated temperature of about 300–400° C. and at a pressure about 100–300 atmospheres and with a carbon monoxide-methanol molecular ratio in the reacting gases of above 2. Water vapor is also preferably present in amount in excess of 1 molecular weight per molecular weight of methanol, for example, four to five mols. per mol. of methanol.

The following examples illustrate my invention:

Example I.—Preparation of catalyst

Prepare tungsten oxide by treating 4200 parts of 5% solution of hexahydrated ammonium tungstate with 425 parts of 70% nitric acid at about 100° C. Separate the precipitate, wash sparingly with water and incorporate with the wet precipitate nitrates of zinc, beryllium and bismuth in amounts corresponding to the following composition expressed as oxides of the metals: oxide of tungsten, $WO_3$, 90 mols.; oxide of zinc, ZnO, 10 mols.; oxide of beryllium, BeO, 0.6 mol.; and oxide of bismuth $Bi_2O_3$, 2.5 mols. Dry the homogeneous mixture at about 165° C. (four hours will be sufficient), then crush and compress into tablet or pill form.

Example II.—Preparation of catalyst

Prepare tungsten oxide as in Example I. Impregnate the wet oxide precipitate with a solution of copper and beryllium nitrates in amounts corresponding to the following composition expressed as oxides: oxide of tungsten, $WO_3$, 90 mols.; oxide of copper, CuO, 10 mols.; oxide of beryllium, BeO, 0.6 mol. Dry the resulting mixture at about 165° C. (five hours is sufficient), then crush and compress into tablet form.

Example III

Prepare tungsten oxide as in Example I. Add to the wet oxide precipitate nitrates of zinc, copper and beryllium in amounts corresponding to the following composition expressed as oxides: oxide of tungsten, $WO_3$, 90 mols.; oxide of zinc, ZnO, 7 mols.; oxide of copper, CuO, 3 mols.; oxide of beryllium, BeO, 0.6 mol. Dry the resulting mixture and compress into pill form as in Example I.

Example IV

Prepare tungsten oxides as in Example I. Add to the wet oxide precipitate nitrates of titanium, bismuth and beryllium in amounts corresponding to the following composition expressed as oxides; oxide of tungsten, $WO_3$, 90 mols.; titanium oxide, 10 mols.; oxide of bismuth, $B_2O_3$, 2.5 mols.; and oxide of beryllium, BeO, 0.6 mol. Dry the mixture and compress into pill form as in Example I.

10 mols. oxide of silicon, $SiO_2$, or oxide of thorium, $ThO_2$, may be substituted for the titanium oxide in this example.

Example V

Prepare tungsten oxide as in Example I. Add to the wet oxide nitrates of aluminum, zinc and bismuth in amounts corresponding to the following composition expressed as oxides: oxide of tungsten, $WO_3$, 90 mols.; oxide of aluminum, $Al_2O_3$, 0.3 mol.; oxide of zinc, ZnO, 10 mols.; and oxide of bismuth, $Bi_2O_3$, 2.5 mols. Dry the mixture and compress into tablet form as in Example I.

.6 mol. cerium oxide, $CeO_2$, may be substituted for the aluminum oxide in this example.

Example VI

A tungsten catalyst prepared for example as described in Example I is placed in a converter capable of withstanding high pressure and lined with silver. A methanol-carbon monoxide gas mixture containing 5.7 mols. CO and 4 mols. water vapor per mol. methanol under a pressure of 200 atmospheres and space velocity of 2,000 is passed through the converter, the catalyst mass being at a temperature of about 375° C. The gaseous mixture leaving the converter is cooled to about 20° C. The condensate containing acetic acid, water, methyl acetate and unchanged methanol, together with small amounts of methyl formate and formic acid, may be distilled to recover the free acetic acid and its methyl ester. The methanol fraction of the condensate may be returned to the process together with the residual uncondensed gases containing unreacted carbon monoxide and in some cases a certain amount of dimethyl ether, suitable adjustment being made by introduction of fresh gases to maintain the desired relationship between the methanol, carbon monoxide and water vapor and by bleeding to prevent excessive accumulation of inert constituents particularly methane.

The aqueous portion of the condensate may also be returned in amount sufficient to maintain the desired water content of the reaction gases in which case the separation of acetic acid therefrom need not be so complete.

Example VII

A tungsten catalyst prepared for example as described in Example II is placed in a converter capable of withstanding high pressure and lined with silver. A methanol-carbon monoxide mixture containing 5.7 mols. CO (also preferably about an equal quantity of hydrogen) and 4 mols. water per mol. methanol under a pressure of 200 atmospheres and space velocity of 4,000 is passed through the converter, the catalyst mass being at a temperature of about 375° C. The gaseous mixture leaving the converter may be treated as in Example VI.

While the function of each ingredient of the catalyst is not definitely known and in any case is probably the result of several interdependent factors, it appears that bismuth acts not only as a promoter of the tungsten per se but also to prevent decomposition or "cracking" of the reacting gases with resultant carbonaceous deposition on or "fouling" of the catalyst. In a tungsten catalyst such as that of Example II which does not contain bismuth, it was found that the inclusion of a substantial amount of hydrogen in the gaseous reaction mixture has much the same effect in inhibiting catalyst "fouling". The maintenance of water vapor in the reaction mixture also seems to be important to inhibit catalyst "fouling". Beryllium appears to function in part at least to give thermal stability to the catalyst.

It also appears important that the tungsten should be present in a hydrated oxide form and in a high state of oxidation preferably approximating that of the oxide $WO_3$ and not less than that of the oxide $W_2O_5$. The presence of water vapor assists in maintaining the tungsten in this condition.

It is further noted that the oxide of tungsten constituent of the catalyst material may be considered as an acid oxide relative to the other constituents and that it is in substantial excess which excess should be at least 100 per cent over that theoretically required to combine with the more basic constituents.

The term "space velocity" as used hereinabove denotes the volume of non-condensable gas in liters (measured at one atmosphere and room temperature) introduced into the converter per hour per liter of catalyst material.

When in the claims reference is made to an acetic acid catalyst or acetic acid, it is intended to include such derivatives of the free acid as the methyl ester or methyl ether since they are a source as such, or upon further catalyst treatment, of acetic acid.

I claim:

1. A process for the production of acetic acid which comprises reacting a gas containing carbon monoxide with methanol in the presence of a catalyst the major portion of the catalytically active portion of which consists of an oxide of tungsten in which the state of oxidation of the tungsten is not less than that represented by $W_2O_5$ and containing at least one of the group beryllium and bismuth.

2. A process for the production of acetic acid which comprises reacting a gas containing carbon monoxide with methanol in the presence of a catalyst the major portion of the catalytically active portion of which consists of an oxide of tungsten in which the state of oxidation of the tungsten is not less than that represented by $W_2O_5$ and containing beryllium.

3. A process for the production of acetic acid which comprises reacting a gas containing carbon monoxide with methanol in the presence of a catalyst the major portion of the catalytically active portion of which consists of an oxide of tungsten in which the state of oxidation of the tungsten is not less than that represented by $W_2O_5$ and containing bismuth 4. A process for the production of acetic acid which comprises reacting a gas containing carbon monoxide with methanol in the presence of a catalyst the major portion of the catalytically active portion of which consists of oxide of tungsten in which the state of oxidation of the tungsten is not less than that represented by $W_2O_5$ and containing beryllium and bismuth.

5. A process for the production of acetic acid which comprises reacting a gas containing carbon monoxide with methanol in the presence of a catalyst the major portion of the catalytically active portion of which consists of oxide of tungsten in which the state of oxidation of the tungsten is not less than that represented by $W_2O_5$ and containing beryllium, bismuth and zinc.

6. A process for the production of acetic acid which comprises reacting a gas containing carbon monoxide with methanol in the presence of a multi-component catalyst one of the components of said catalyst, constituting the major portion of the catalytically active portion of the catalyst, consisting of an oxide of tungsten in which the state of oxidation of the tungsten is not less than that represented by $W_2O_5$, another component of said catalyst being an oxide from the group consisting of the oxides of zinc, silica, thorium and cerium, and another component of said catalyst being an oxide from the group consisting of the oxides of bismuth and beryllium.

7. A process for the production of acetic acid which comprises passing carbon monoxide, methanol and water vapor in proportions of more than 2 molecular weights of carbon monoxide and more than 1 molecular weight of water vapor for each molecular weight of methanol in contact with a catalyst the major portion of the catalytically active portion of which consists of oxide of tungsten in which the state of oxidation of the tungsten is not less than that represented by $W_2O_5$, and containing beryllium.

8. A process for the production of acetic acid which comprises passing carbon monoxide, methanol and water vapor in proportions of more than 2 molecular weights of carbon monoxide and more than 1 molecular weight of water vapor for each molecular weight of methanol in contact with a catalyst the major portion of the catalytically active portion of which consists of oxide of tungsten in which the state of oxidation of the tungsten is not less than that represented by $W_2O_5$ and containing beryllium, said carbon monoxide, methanol and water vapor being contacted with the catalyst at a temperature of 300° C. to 400° C. at a pressure above atmospheric.

9. A process for the production of acetic acid which comprises reacting a gas containing carbon monoxide with methanol in the presence of a hydrated oxide of tungsten catalyst containing at least one of the group beryllium and bismuth, the state of oxidation of the tungsten being not less than that represented by $W_2O_5$.

10. A process for the production of acetic acid which comprises reacting a gas containing carbon monoxide with methanol in the presence of a hydrated oxide of tungsten catalyst containing at least one of the group beryllium and bismuth.

11. A process for the production of acetic acid which comprises reacting a gas containing carbon monoxide with methanol in the presence of a hydrated oxide of tungsten containing beryllium and bismuth.

12. A process for the production of acetic acid which comprises reacting a gas containing carbon monoxide with methanol in the presence of a multi-component catalyst one of the components of said catalyst, constituting the major portion of the catalytically active portion of the catalyst, consisting of a hydrated oxide of tungsten, another component of said catalyst being an oxide from the group consisting of the oxides of zinc, silicon, thorium and cerium, and another component of said catalyst being an oxide from the group consisting of the oxides of bismuth and beryllium.

13. A process for the production of acetic acid which comprises passing carbon monoxide, methanol and water vapor in proportions of more than 2 molecular weights of carbon monoxide and more than 1 molecular weight of water vapor for each molecular weight of methanol in contact with a hydrated oxide of tungsten catalyst containing beryllium.

14. A process for the production of acetic acid which comprises reacting a gas containing carbon monoxide with methanol in the presence of a catalyst the major portion of the catalytically active portion of which consists of an oxide of tungsten in which the state of oxidation of the tungsten is not less than that represented by $W_2O_5$ and containing an oxide of at least one of the group beryllium and bismuth.

15. A process for the production of acetic acid which comprises reacting a gas containing carbon monoxide with methanol in the presence of a catalyst the major portion of the catalytically active portion of which consists of oxide of tungsten in which the state of oxidation of the tungsten is not less than that represented by $W_2O_5$ and containing beryllium, bismuth and zinc oxides.

16. A process for the production of acetic acid which comprises reacting a gas containing carbon monoxide with methanol in the presence of a hydrated oxide of tungsten catalyst containing an oxide of at least one of the group beryllium and bismuth, the state of oxidation of the tungsten being not less than that represented by $W_2O_5$.

RALPH LYMAN BROWN.